(12) United States Patent
Gopal et al.

(10) Patent No.: US 8,478,809 B2
(45) Date of Patent: Jul. 2, 2013

(54) METHOD AND APPARATUS FOR MULTIPLYING POLYNOMIALS WITH A PRIME NUMBER OF TERMS

(75) Inventors: Vinodh Gopal, Westborough, MA (US); Michael E. Kounavis, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 967 days.

(21) Appl. No.: 11/957,450

(22) Filed: Dec. 15, 2007

(65) Prior Publication Data

US 2009/0157790 A1    Jun. 18, 2009

(51) Int. Cl.
*G06F 7/523* (2006.01)

(52) U.S. Cl.
USPC .............................................. 708/620; 708/7

(58) Field of Classification Search
USPC ........................................................ 708/620
See application file for complete search history.

(56) References Cited

U.S. PATENT DOCUMENTS

| | | | |
|---|---|---|---|
| 6,343,305 B1 * | 1/2002 | Koç et al. ....................... | 708/492 |
| 6,766,345 B2 * | 7/2004 | Stein et al. .................... | 708/492 |
| 7,266,579 B2 * | 9/2007 | Dupaquis et al. ............. | 708/620 |
| 7,363,336 B1 * | 4/2008 | Montgomery ................ | 708/492 |
| 7,765,252 B1 * | 7/2010 | Montgomery ................ | 708/620 |
| 2003/0212729 A1 * | 11/2003 | Eberle et al. .................. | 708/625 |
| 2004/0109561 A1 * | 6/2004 | Koc et al. ........................ | 380/28 |
| 2009/0136022 A1 * | 5/2009 | Langendoerfer et al. ....... | 380/28 |

OTHER PUBLICATIONS

Zoya Dyka and Peter Langendoerfer, 2005 , pp. 70-75 vol. 3, IEEE, Area Efficient Hardware Implementation of Elliptic Curve Cryptography by Iteratively Applying Karatsuba's Method.*
Yazaki et al, VLSI Design of Iterative Karatsuba Multiplier and Its Evaluation, almond.cs.uec.ac.jp/papers/pdf/2006, 2006.*
Peter L. Montgomery, "Five, Six and Seven-term Karatsuba-like formulae", IEEE Transactions on Computers, vol. 54, No. 3, Mar. 2005.
A Weimerskirch, C Paar, "Generalizations of the Karatsuba algorithm for efficient implementation", 17 pages, 2006, http://citeseer.ist.psu.edu/571363.html.

* cited by examiner

*Primary Examiner* — Lewis A Bullock, Jr.
*Assistant Examiner* — Viva Miller
(74) *Attorney, Agent, or Firm* — Christopher K. Gagne

(57) ABSTRACT

An efficient method and apparatus to compute a product of polynomials of degree n−1 where n is an arbitrary prime is provided. The total number of multiply operations and Arithmetic Logical Unit (ALU) operations to compute the product is minimized through the judicious use of polynomial evaluations at few points to decrease the number of multiplications while using only simple ALU operations.

6 Claims, 3 Drawing Sheets

METHOD AND APPARATUS FOR MULTIPLYING POLYNOMIALS WITH A PRIME NUMBER OF TERMS

FIELD

This disclosure relates to polynomial operations and in particular to polynomial multiplication.

BACKGROUND

A polynomial is a mathematical expression of one or more algebraic terms, for example, "a+bx+cx$^2$", each of which consists of a constant (a, b or c) multiplied by one or more variables (x) raised to a nonnegative integral power. The schoolbook method to multiply two polynomials is to multiply each term of a first polynomial by each term of a second polynomial. For example, a first polynomial of degree 1 with two terms $a_1x+a_0$ may be multiplied by a second polynomial of degree 1 with two terms $b_1x+b_0$ by performing four multiply operations and three addition operations to produce a polynomial of degree 2 with three terms as shown below:

$$(a_1x+a_0)(b_1x+b_0)=a_1b_1x^2+(a_0b_1x+a_1b_0x)+a_0b_0$$

The number of multiply operations and Arithmetic Logical Unit (ALU) operations increases with the number of terms in the polynomials. For example, using the schoolbook method, the number of multiply operations to multiply two polynomials each having n$^2$ terms is n and the number of additions is $(n-1)^2$.

BRIEF DESCRIPTION OF THE DRAWINGS

Features of embodiments of the claimed subject matter will become apparent as the following detailed description proceeds, and upon reference to the drawings, in which like numerals depict like parts, and in which:

Figure 1:
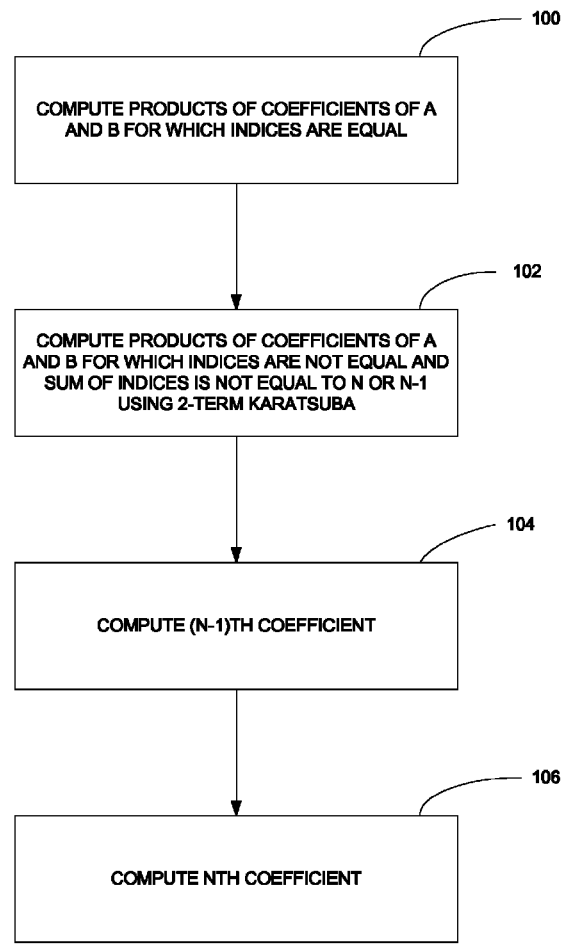
FIG. 1 is a flowchart illustrating an embodiment of a method to compute the product C(x) of two polynomials A(x) and B(x) each having n terms, where n is a prime number according to the principles of the present invention.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Polynomial operations such as polynomial multiplication are important in cryptography, for example, in the context of Elliptic curves and for use with other public key encryption algorithms such as Rivest, Shamir, Adleman (RSA).

The Karatsuba algorithm reduces the number of multiply operations compared to the schoolbook method by multiplying two two-term polynomials $(A(x)=a_1x+a_0)$ and $B(x)=(b_1x+b_0))$, each having two coefficients $((a_1,a_0)$ and $(b_1,b_0))$, using three scalar multiplications instead of four multiplications as shown below:

$$C(x)=(a_1x+a_0)(b_1x+b_0)=a_1b_1x^2+((a_0+a_1)(b_0+b_1)-a_0b_0-a_1b_1)+a_0b_0$$

Thus, four additions and three multiplications are required to compute the result C(x) of multiplying two two-term polynomials using the Karatsuba algorithm. The Karatsuba algorithm may also be used to multiply two three-term polynomials using six scalar multiplications instead of nine multiplications.

Polynomial multiplication may be performed efficiently using the Karatsuba-Ofman algorithm as discussed in "Five, Six and Seven-term Karatsuba-like formulae", Peter L Montgomery, IEEE Transactions on Computers, Vol. 54, No. 3, March 2005. The Karatsuba-Ofman algorithm performs polynomial multiplications using a sub-quadratic number of base multiply operations at the expense of simpler Arithmetic Logical Unit (ALU) operations. The task of finding efficient formulae for arbitrary term polynomials is extremely hard. Montgomery performed a search to solve 5 and 7 term polynomial multiplications and the result is a Karatsuba-like formula, which when executed, is a Karatsuba algorithm for 5 and 7-term polynomials. However, the exhaustive search method has an exponential run-time and thus cannot be extended beyond seven terms, due to computational infeasibility.

Polynomial multiplication for two polynomials A(x), B(x) of arbitrary degree-d with n=d+1 coefficients may be performed using a one-iteration (non-recursive) Karatsuba algorithm as discussed in "Generalizations of the Karatsuba algorithm for efficient implementation", A Weimerskirch, C Paar, by:

(1) Computing $D=a_ib_j$, for each i=0 to n−1, $D=a_ib_j$ then calculating $$D_{s,t}:=(a_s+a_t)(b_s+b_t) \text{ for each } i=1 \text{ to } 2n-3, \text{ and for all } s \text{ and } t \text{ with } s+t=i \text{ and } t>s>=0.$$

(2) Using these computed values to compute each co-efficient of C(x).

However, this technique is not optimal in terms of the number of scalar computations.

A prime number is any integer other than 0 or ±1 that is not divisible without remainder by any other integers except ±1 and ± the integer itself. For example, 2, 3, 5, 7, 11, and 13 are prime numbers. An embodiment of the present invention provides a method and apparatus that uses a non-recursive Karatsuba (KA) algorithm to multiply polynomials having an arbitrary prime number of terms with fewer multiplications than prior art methods and that has a better performance than the Montgomery exhaustive search for polynomials having five and seven terms.

In contrast to the Montgomery exhaustive search method which is limited to seven terms due to computational infeasibility, an embodiment of the present invention may be applied to any arbitrary prime number of terms. An embodiment uses Arithmetic Logical Unit (ALU) operations such as addition/subtraction and a single-bit shift in addition to multiplication and has less ALU operations than the Montgomery exhaustive search method for five and seven-term polynomials.

FIG. 1 is a flowchart illustrating an embodiment of a method to compute the product C(x) of two polynomials A(x) and B(x) each having n terms, where n is a prime number according to the principles of the present invention.

The product C(x) may be computed as follows:

$$C(x) = (a_{(n-1)} \cdot X^{n-1} + a_{(n-2)} \cdot X^{n-2} + \ldots a_1 \cdot X + a_0) *$$
$$(b_{(n-1)} \cdot X^{n-1} + b_{(n-2)} \cdot X^{n-2} + \ldots b_1 \cdot X + b_0)$$

C(x) may be represented as follows:

$$C(x) = c_{2(n-1)} X^{2(n-1)} + \ldots c_1 \cdot X + c_0.$$

An embodiment of the invention in which both polynomials A(x) and B(x) have five terms, that is, n is equal to 5 (a prime number) and are of degree 4 will be described. In this embodiment, C(x) is computed as follows:

$$C(x) = (a_4 \cdot X^4 + a_3 \cdot X^3 + \ldots a_1 \cdot X + a_0) *$$
$$(b_4 \cdot X^4 + b_3 \cdot X^3 + \ldots b_1 \cdot X + b_0)$$
$$= c_8 \cdot X^8 + \ldots c_1 \cdot X + c_0$$

Figure 2:
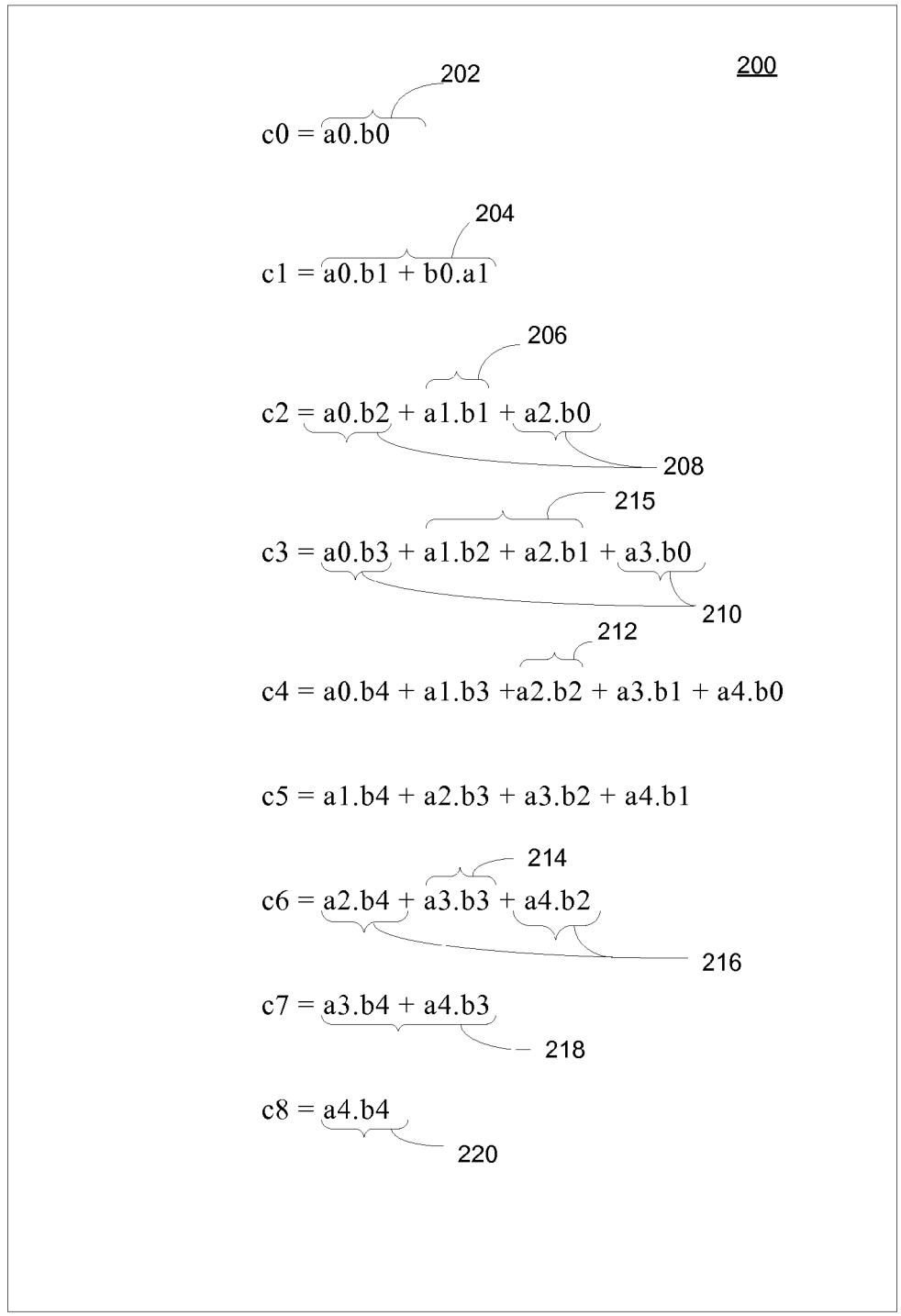
FIG. 2 illustrates the computation of the coefficients of a polynomial C(x) of degree eight using the coefficients of polynomials A(x) and B(x) of degree four.

FIG. 2 illustrates the computation of the individual coefficients of a polynomial C(x) of degree 8 using the individual coefficients of polynomials A(x) and B(x) of degree 4. As shown in FIG. 2, the computation of the coefficients c0-c8 of C(x) 200 requires the computation of five products using the five coefficients of A(x), that is, (a0-a4) and the five coefficients of B(x), that is, (b0-b4) for which the indices (0-4) are equal, that is, (a0.b0) 202, (a1.b1) 206, (a2.b2) 212, (a3.b3) 214 and (a4.b4) 220.

Returning to FIG. 1, at block 100, the products of coefficients for which indices are equal ($a_i$, $b_i$) as shown in FIG. 2, are computed first. Some of these products will be used later to compute some of the coefficients of C(x) using the 2 term Karatsuba algorithm. Processing continues with block 102.

At block 102, the products of the coefficients of A and B that can be computed as a series of 2-term Karatsuba multiplications are computed. The computation of the coefficients of C(x), that is, c0-c8 requires the computation of $s=(a_i.b_j + a_j.b_i)$, where i!=j, as shown in FIG. 2. The number of multiply operations for computing ($a_i.b_j + a_j.b_i$), where i!=j may be reduced from two to one through the use of a 2-term Karatsuba algorithm, by computing:

$$s = (a_i + a_j) * (b_i + b_j) - a_i.b_i - a_j.b_j$$

As the products $a_i.b_i$ and $a_j.b_j$ have already been computed at block 100, only one product need be computed, that is, $(a_i + a_j) * (b_i + b_j)$. For example, the computation of coefficient c7 of C(x) which requires the computation of (a3.b4+a4.b3), that requires the result of two multiply operations (a3.b4), (a4.b3) and an addition. Coefficient c3 of C(x) may be computed as a 2-term Karatsuba Algorithm by computing (a0.b3+a3.b0) with a single multiply operation and computing (a1.b2+a2.b1) with a second multiply operation. A plurality of two-term Karatsuba multiplications are performed using coefficients of A and B for which indices i!=j and i+j is not equal to n or n−1. That is, the following computation is performed:

$$D_{s,t} := (a_s + a_t)(b_s + b_t)$$

for each i=1 to 2n−3, and for all s and t with s+t=i, s+t!=n and s+t !=(n−1) and t>s>=0.

The coefficients c0-c3 and c6-c8 of C(x) shown in FIG. 2 are computed using the computed 2-term Karatsuba multiplications 204, 208, 215, 210, 218 and the products of same indices 202, 206, 212, 214, 220. Processing continues with block 104.

At block 104, coefficient c4 could be computed using two 2 term Karatsuba multiplications (a0.b4, a4.b0) and (a1.b3, a3.b1) and a pre-computed product (a2.b2). However, this would require two multiply operations to compute coefficient c4 and two multiply operations to compute coefficient c5. The total number of multiply operations to compute C(x) may be reduced by evaluating the polynomial C(x) at 2 points {−1, 1} as shown below in Table 1:

TABLE 1

With x = 1

C(1) = A(1) * B(1)
  = ($a_4 + a_3 + \ldots a_1 + a_0$) * ($b_4 + b_3 + \ldots b_1 + b_0$)
  = $c_0 + c_1 + c_2 + c_3 + c_4 + c_5 + c_6 + c_7 + c_8$ With x = −1

C(−1) = A(−1) * B(−1)
  = ($a_4 − a_3 + a_2 − a_1 + a_0$) * ($b_4 − b_3 + b_2 − b_1 + b_0$).
  = $c_0 − c_1 + c_2 − c_3 + c_4 − c_5 + c_6 − c_7 + c_8$

Each of the evaluations of C(x) shown in Table 1 requires one multiply operation (product) for a total of 2 multiply operations.

The result of adding C(1) and C(−1) is as shown below:

$$C(1) + C(-1) = (c_0 + c_1 + c_2 + c_3 + c_4 + c_5 + c_6 + c_7 + c_8) +$$
$$c_0 - c_1 + c_2 - c_3 + c_4 - c_5 + c_6 - c_7 + c_8$$
$$= 2[c0 + c2 + c4 + c6 + c8]$$

As the coefficients c0, c2, c6 and c8 have already been computed as discussed in conjunction with block 100 and block 102, coefficient c4 of C(x) may be computed using these coefficients (c0, c2, c6 and c8) as shown below:

$$c4 = \{[C(x=1) + C(x=-1)] >> 1\} - [c0 + c2 + c6 + c8]$$

Processing continues with block 106.

At block 106, coefficient c5 of C(x) may be computed in a similar manner by subtracting C(1) and C(−1) as shown below:

$$C(1) - C(-1) = (c_0 + c_1 + c_2 + c_3 + c_4 + c_5 + c_6 + c_7 + c_8) -$$
$$c_0 - c_1 + c_2 - c_3 + c_4 - c_5 + c_6 - c_7 + c_8$$
$$= 2[c1 + c3 + c5 + c7]$$

Thus, c5 may be computed using these computed coefficients as shown below:

$$c5 = \{[C(1) - C(-1)] >> 1\} - [c1 + c3 + c7]$$

Thus, only two multiply operations are used to compute coefficients c4 and c5, one to compute C(−1) and the other to compute C(1). The further calculations to compute coefficients c4 and c5 using C(−1) and C(1) only require simple addition/subtraction or right-shift-logical-by-one operations.

The total number of multiply operations is thus 13 to compute all coefficients of C(x), that is, c0-c8 in contrast to the 15 required using the one-iteration (non-recursive) Karatsuba algorithm. Referring to FIG. 2, five multiply operations to compute (a0.b0) 202, (a1.b1) 206, (a2.b2) 212, (a3.b3) 214 and (a4.b4) 220, six multiply operations to compute (a0b1, b1a0) 204, (a0b2, b2a0) 208, (a1b2, a2b1) 215, (a0b3, b3a0) 210, (a2b4, b4,a2) 216, (a3b4, b4, a3) 248 and two multiply operations to compute C(1) and C(−1). The number of multiply operations for multiplying two 5-term polynomials of degree 4 is equivalent to the number of multiply operations required for Montgomery exhaustive search for the total number of multiply operations and is better in terms of number of the total number of ALU operations.

An embodiment has been described for multiplying two 5 term polynomials (A(x) with coefficients $a_4$-$a_0$, B(x) with coefficients $b_4$-$b_0$) to produce a nine term polynomial result ($c_8$-$c_0$) of degree 8. However, the invention is not limited to multiplication of 5 term polynomials of degree 4. An embodiment may use polynomials having any prime number of terms n.

All coefficients of the C(x) result of multiplying two n-term polynomials where n is prime, except for the (n−1)th coefficient and the nth coefficient may be computed as discussed in conjunction with blocks 100 and 102 in FIG. 1. Then, C(x) is evaluated at points {−1, 1} and the linear system of equations solved to derive the (n−1)th and nth coefficients which only requires two multiply operations. Thus, the number of multiply operations is n(n+1)/2−[n−3] for multiplying two n-term polynomials of degree n−1.

Thus, the number of multiply operations is 13 for a polynomial of degree 4, that is, with five terms (n=5), which is the same number of multiply operations as required for the exhaustive search Montgomery technique and less (by two) than the number used by the one-iteration (non-recursive) Karatsuba algorithm technique. As there is no limit to the number of terms in the polynomials to be multiplied, an embodiment of the invention may be used for a prime number of terms of 11 and greater, that is, cases for which the exhaustive search Montgomery technique cannot be used. Also, for prime terms of 11 and greater, the number of multiply operations is 24 in contrast to the 28 multiply operations required by the one-iteration (non-recursive) Karatsuba algorithm (1−KA) technique.

An embodiment of the invention pertains to an efficient method and apparatus to compute the product of two polynomials having an arbitrary prime number of terms. The total number of multiply operations is less than used by the one iteration non-recursive Karatsuba algorithm and is similar to the number of multiply operations used by the exhaustive search technique discussed by Montgomery for some prime number of terms.

In contrast to the exhaustive search technique of Montgomery which is limited to 7 terms due to computational infeasibility, an embodiment of the invention may be applied to polynomials having any arbitrary prime number of terms. An embodiment of the invention uses only Arithmetic Logical Unit (ALU) operations such as addition/subtraction and single-bit shift operations in addition to multiply operations and very few total ALU operations compared to exhaustive search technique of Montgomery through the judicious use of polynomial evaluations at few points to decrease the number of multiplications while using only simple ALU operations.

The performance of an embodiment of the invention is better than the exhaustive Montgomery search for multiplication of 5-term and 7-term polynomials even though the number of multiply operations are the same because there are less ALU operations (addition/subtraction and shift).

An embodiment has been described for integer-fields. However, the invention is not limited to integer-fields, for example, an embodiment may use Galois Fields (GF($2^n$)) instead of integer-fields.

Figure 3:
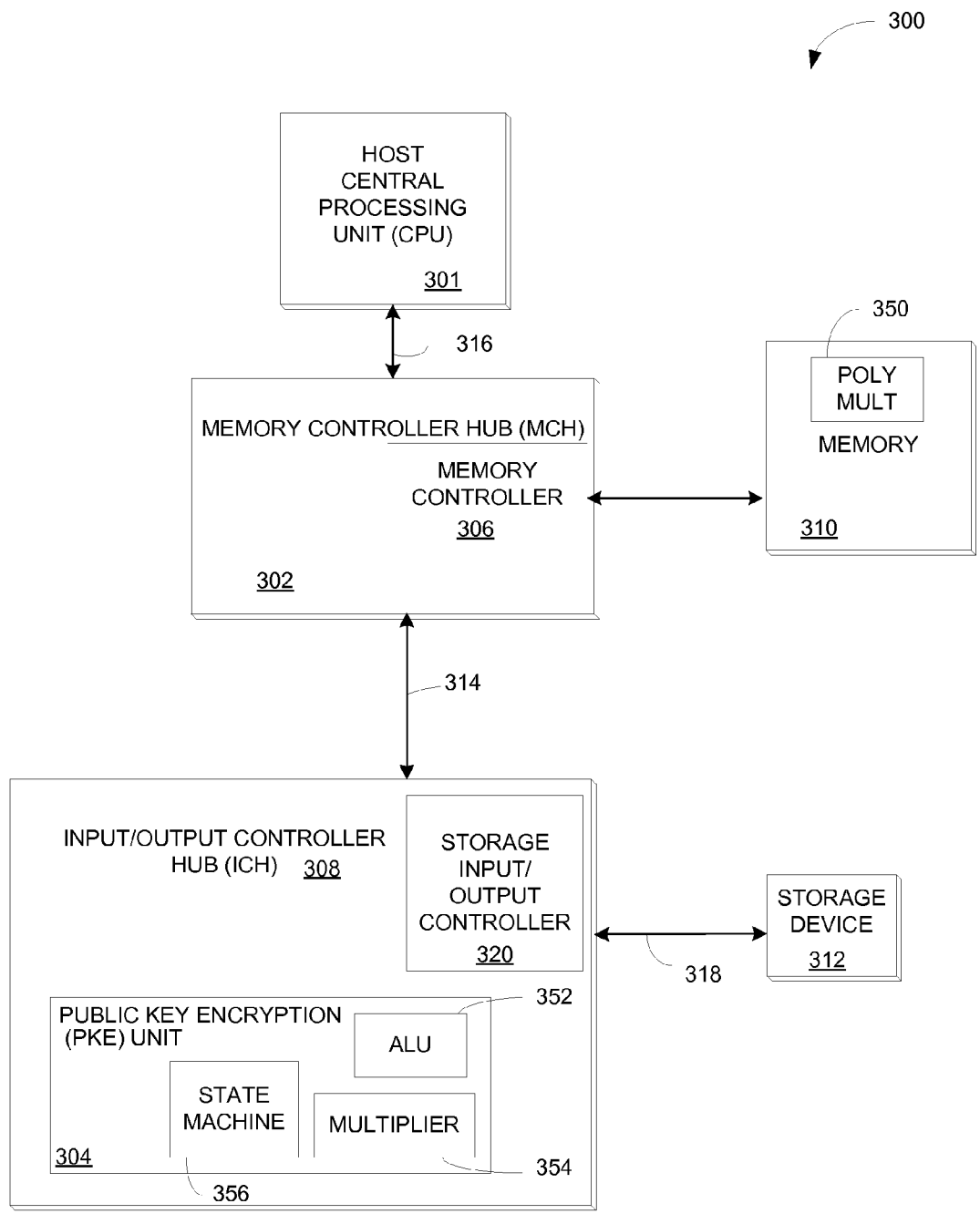
FIG. 3 is a block diagram of a system that includes an embodiment of Public Key Encryption (PKE) unit to perform public key encryption using an embodiment of a method to compute the product C(x) of two polynomials A(x) and B(x) each having n terms, where n is a prime number.

FIG. 3 is a block diagram of a system 100 that includes an embodiment of Public Key Encryption (PKE) unit 108 to perform public key encryption using an embodiment of a method to compute the product C(x) of two polynomials A(x) and B(x) each having n terms, where n is a prime number.

The system 100 includes a processor 301, a Memory Controller Hub (MCH) 302 and an Input/Output (I/O) Controller Hub (ICH) 304. The MCH 302 includes a memory controller 306 that controls communication between the processor 301 and memory 310. The processor 301 and MCH 302 communicate over a system bus 316.

The processor 301 may be any one of a plurality of processors such as a single core Intel® Pentium IV® processor, a single core Intel Celeron processor, an Intel® XScale processor or a multi-core processor such as Intel® Pentium D, Intel® Xeon® processor, or Intel® Core® Duo processor or any other type of processor.

The memory 310 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 304 may be coupled to the MCH 302 using a high speed chip-to-chip interconnect 314 such as Direct Media Interface (DMI). DMI supports 2 Gigabit/second concurrent transfer rates via two unidirectional lanes.

The ICH 304 may include a storage I/O controller 320 for controlling communication with at least one storage device 312 coupled to the ICH 304. The storage device 312 may be, for example, a disk drive, Digital Video Disk (DVD) drive, Compact Disk (CD) drive, Redundant Array of Independent Disks (RAID), tape drive or other storage device. The ICH 304 may communicate with the storage device 312 over a storage protocol interconnect 318 using a serial storage protocol such as, Serial Attached Small Computer System Interface (SAS) or Serial Advanced Technology Attachment (SATA).

In an embodiment, the Public Key Encryption (PKE) unit 108 includes a state machine 356, an Arithmetic Logical Unit (ALU) 352 and a multiplier 354 to perform multiplication of polynomials as discussed in conjunction with FIGS. 1 and 2. The ALU 352 performs integer operations such as addition and subtraction and also performs bit-shifting operations, for example, shifting or rotating by a specified number of bits to the left or right. The state machine 356 controls the sequence of operations performed by the ALU 352 and the multiplier 354 to perform the polynomial multiplication.

In another embodiment, the polynomial multiplication as discussed in conjunction with FIGS. 1 and 2 may be performed by CPU 316 executing a polynomial multiplication library function 350 that may be stored in memory 310.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. A method comprising:

using a certain algorithm to perform polynomial multiplication, the certain algorithm including a first set of operations that comprises a subset of a second set of operations that implements a non-recursive Karatsuba algorithm (KA), the first set of operations also comprising at least one operation in addition to the second set of operations, wherein the certain algorithm comprises multiplying two respective polynomials that have respective prime numbers of respective terms, the certain algorithm employing only arithmetic and local unit (ALU) operations and other operations performed by a multiplier, the ALU operations comprising addition, subtraction, multiplication, and bit shifting operations, the certain algorithm resulting in a first number of multiply operations involved in multiplying certain polynomials that is less than a second number of multiply operations employed in KA multiplication of the certain polynomials, the certain algorithm including computing coefficients of a product $C(x)$ of two n term polynomials $A(x)$ and $B(x)$ by first calculating a plurality of precomputed products for $a_i b_i$, wherein $i=0$ to $n-1$; and secondly calculating $C(x)=(a_i+a_j)*(b_i+b_j)-a_i b_i-a_j b_j$ for each i and j from 0 to $n-1$, further wherein calculation of $C(x)$ involving $a_i b_i$ and $a_j b_j$ corresponds to the precomputed products and are not recalculated for the calculation; the second calculating being based upon two-term Karatsuba multiplications using coefficients of the polynomials $A(x)$ and $B(x)$ for which respective indices i and j are not equal and also for which i+j is not equal to n or $n-1$, the ALU operations being performed by an ALU comprised in a public key encryption unit, the encryption unit also comprising a state machine and the multiplier, the state machine being to control sequence of the ALU operations performed by the ALU and the other operations performed by the multiplier to perform the first number of multiply operations, the encryption unit being comprised in an input/output (I/O) controller hub, the controller hub comprising a storage I/O controller to control communication with at least one storage device to be coupled to the controller hub, the communication being via a serial storage interconnect using a serial storage protocol.

2. The method of claim 1, wherein:
the controller hub is coupled to host central processing unit and to a memory.

3. An apparatus comprising:

an arithmetic and local unit (ALU) to perform ALU operations and a multiplier to perform other operations that implement a certain algorithm to perform polynomial multiplication, the certain algorithm including a first set of operations that comprises a subset of a second set of operations that implements a non-recursive Karatsuba algorithm (KA), the first set of operations also comprising at least one operation in addition to the second set of operations, wherein the certain algorithm comprises multiplying two respective polynomials that have respective prime numbers of respective terms, the certain algorithm employing only arithmetic and local unit (ALU) operations and other operations performed by a multiplier, the ALU operations comprising addition, subtraction, multiplication, and bit shifting operations, the certain algorithm resulting in a first number of multiply operations involved in multiplying certain polynomials that is less than a second number of multiply operations employed in KA multiplication of the certain polynomials, the certain algorithm including computing coefficients of a product $C(x)$ of two n term polynomials $A(x)$ and $B(x)$ by first calculating a plurality of precomputed products for $a_i b_i$ wherein $i=0$ to $n-1$; and secondly calculating $C(x)=(a_i+a_j)*(b_i+b_j)-a_i b_i-a_j b_j$ for each i and j from 0 to $n-1$, further wherein calculation of $C(x)$ involving $a_i b_i$ and $a_j b_j$ corresponds to the precomputed products and are not recalculated for the calculation; the second calculating being based upon two-term Karatsuba multiplications using coefficients of the polynomials $A(x)$ and $B(x)$ for which respective indices i and j are not equal and also for which i+j is not equal to n or $n-1$, the ALU operations being performed by an ALU comprised in a public key encryption unit, the encryption unit also comprising a state machine and the multiplier, the state machine being to control sequence of the ALU operations performed by the ALU and the other operations performed by the multiplier to perform the first number of multiply operations, the encryption unit being comprised in an input/output (I/O) controller hub, the controller hub comprising a storage I/O controller to control communication with at least one storage device to be coupled to the controller hub, the communication being via a serial storage interconnect using a serial storage protocol.

4. The apparatus of claim 3, wherein:
the controller hub is coupled to host central processing unit and to a memory.

5. A non-transitory machine-usable medium storing computer readable program code that when executed results in a machine performing the following operations:

using a certain algorithm to perform polynomial multiplication, the certain algorithm including a first set of operations that comprises a subset of a second set of operations that implements a non-recursive Karatsuba algorithm (KA), the first set of operations also comprising at least one operation in addition to the second set of operations, wherein the certain algorithm comprises multiplying two respective polynomials that have respective prime numbers of respective terms, the certain algorithm employing only arithmetic and local unit (ALU) operations and other operations performed by a multiplier, the ALU operations comprising addition, subtraction, multiplication, and bit shifting operations, the certain algorithm resulting in a first number of multiply operations involved in multiplying certain polynomials that is less than a second number of multiply operations employed in KA multiplication of the certain polynomials, the certain algorithm including computing coefficients of a product $C(x)$ of two n term polynomials $A(x)$ and $B(x)$ by first calculating a plurality of precomputed products for $a_i b_i$ wherein $i=0$ to $n-1$; and secondly calculating $C(x)=(a_i+a_j)*(b_i+b_j)-a_i b_i-a_j b_j$ for each i and j from 0 to $n-1$, further wherein calculation of $C(x)$ involving $a_i b_i$ and $a_j b_j$ corresponds to the precomputed products and are not recalculated for the calculation; the second calculating being based upon two-term Karatsuba multiplications using coefficients of the polynomials $A(x)$ and $B(x)$ for which respective indices i and j are not equal and also for which i+j is not equal to n or $n-1$, the ALU operations being performed by an ALU comprised in a public key encryption unit, the encryption unit also comprising a state machine and the multiplier, the state machine being to control sequence of the ALU operations performed by the ALU and the other operations performed by the multiplier to perform the first number of multiply operations, the encryption unit being comprised in an input/output (I/O) controller hub, the controller hub comprising a storage I/O controller to control communication with at least one storage device to be coupled to the controller hub, the communication being via a serial storage interconnect using a serial storage protocol.

6. The medium of claim 5, wherein:

the controller hub is coupled to host central processing unit and to a memory.

* * * * *

UNITED STATES PATENT AND TRADEMARK OFFICE
CERTIFICATE OF CORRECTION

PATENT NO. : 8,478,809 B2
APPLICATION NO. : 11/957450
DATED : July 2, 2013
INVENTOR(S) : Vinodh Gopal et al.

Page 1 of 1

It is certified that error appears in the above-identified patent and that said Letters Patent is hereby corrected as shown below:

In the Claims

In column 7, line 12, in claim 1, delete "arithmetic and local unit" and insert -- arithmetic and logical unit --, therefor.

In column 7, line 49, in claim 3, delete "arithmetic and local unit" and insert -- arithmetic and logical unit --, therefor.

In column 7, line 60, in claim 3, delete "arithmetic and local unit" and insert -- arithmetic and logical unit --, therefor.

In column 8, line 41, in claim 5, delete "arithmetic and local unit" and insert -- arithmetic and logical unit --, therefor.

Signed and Sealed this
Fifteenth Day of October, 2013

Teresa Stanek Rea
*Deputy Director of the United States Patent and Trademark Office*